(12) United States Patent
Sudou

(10) Patent No.: US 6,836,102 B2
(45) Date of Patent: Dec. 28, 2004

(54) BOOSTER TYPE SWITCHING REGULATOR

(75) Inventor: Minoru Sudou, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/245,411

(22) Filed: Sep. 17, 2002

(65) Prior Publication Data
US 2003/0062880 A1 Apr. 3, 2003

(30) Foreign Application Priority Data
Oct. 3, 2001 (JP) .......................... 2001-307772

(51) Int. Cl.[7] .............................................. G05F 1/20
(52) U.S. Cl. ...................................................... 323/282
(58) Field of Search ................................ 323/282, 283, 323/284, 351, 908; 361/93.9

(56) References Cited
U.S. PATENT DOCUMENTS 4,631,470 A * 12/1986 Bingley ...................... 323/282
5,187,653 A * 2/1993 Lorenz ......................... 363/89
5,374,887 A * 12/1994 Drobnik ...................... 323/299
5,420,780 A * 5/1995 Bernstein et al. ............. 363/89
6,542,344 B1 * 4/2003 Mashiko ..................... 361/93.9

* cited by examiner

Primary Examiner—Adolf Berhane
(74) Attorney, Agent, or Firm—Adams & Wilks

(57) ABSTRACT

A voltage regulator which suppresses an inrush current at the time of power application has input and output terminals, a power supply connected to the input terminal, a switch circuit connected to the power supply, a coil connected between the switch circuit and the output terminal, a rectifying device connected in series between the coil and the output terminal, an output capacitor connected to the output terminal, a switching element connected between the coil and the rectifying device, a driving circuit for driving the switching element, a transistor connected between the power supply and the coil, and a control circuit connected to the transistor for gradually varying an ON resistance of the transistor from a relatively large value immediately after the switch circuit is turned on to a relatively small value a predetermined time thereafter to limit a rush current flowing into the output capacitor from the power supply.

13 Claims, 4 Drawing Sheets

BOOSTER TYPE SWITCHING REGULATOR

BACKGROUND OF THE INVENTION

1. Field of the Invention

The present invention relates to a booster type switching regulator (herein after referred to as a booster type SW regulator) in which an inrush current for charging an output capacitor from the power supply through a coil can be suppressed when a power supply is turned on.

2. Description of the Related Art

A conventional booster type SW regulator has a structure such as that of the circuit shown in FIG. 6.

An input power supply 20 of FIG. 6 is connected to a coil 21 and a power supply terminal 1 of a booster type SW regulator control circuit 30, the other end of the coil 21 is connected to a drain of a switch ("SW") element 22 and an anode of a commutation diode 23, a cathode of the diode 23 is connected to an output voltage terminal 2 of the booster type SW regulator control circuit 30, and a capacitor 24 and a load 25 are connected to the output voltage terminal 2. When the voltage of the output voltage terminal 2 is denoted by Vout, the booster type SW regulator control circuit 30 controls the ON/OFF state of the SW element 22 so that Vout becomes constant. A gate of the SW element 22 is connected to a terminal 3 of a driving circuit 31 for the SW element, and is driven by a voltage Vext of the terminal 3 to turn ON/OFF the SW element 22. In FIG. 6, the SW element is an N-ch MOS transistor, and in order to turn ON the SW element, the voltage Vext of the output terminal 3 of the driving circuit 31 becomes a positive voltage "H", and in order to turn OFF the SW element 2, a GND level voltage is outputted as the voltage Vext. Both a source of the SW element 22 and a substrate are connected to the GND level.

A switch circuit (hereinafter referred to as a SW circuit) 10 is for connecting the power supply 20 and the booster type SW regulator circuit, and when the booster type SW regulator circuit is in an OFF state, the SW circuit 10 is opened (hereinafter, a state where the SW circuit 10 is opened will be referred to as a state where the SW circuit 10 is in an OFF state). When the booster type SW regulator circuit is turned ON, the SW circuit 10 is closed (hereinafter, a state where the SW circuit 10 is closed will be referred to as a state where the SW circuit 10 is in an ON state).

In general, a mechanical circuit is used for the SW circuit 10.

When the SW circuit 10 is turned ON, the output capacitance 24 is charged up to the voltage of the power supply 20 from the power supply 20 through the SW circuit 10, the coil 21, and the diode 23, and a large inrush current flows by this. This is shown in FIGS. 7A and 7B.

In FIGS. 7A and 7B, the horizontal axis indicates time, FIG. 7A shows a current Ip of the power supply 20, and FIG. 7B shows a voltage Vout of the output capacitance 24. At a time T1, the SW circuit 10 is turned ON, and at a time T2, the output capacitance 24 is charged to the voltage of the power supply 20, and the current of the power supply 20 becomes small. Thereafter, a boosting operation is gradually performed by a soft start circuit.

However, in the conventional booster type SW regulator, there is a problem that when the power supply is turned ON from the OFF state (when the SW circuit 10 is turned ON from the OFF state), a large inrush current flows.

SUMMARY OF THE INVENTION

The present invention has been made in order to solve the problem described in the related art, and therefore it is an object of the present invention to suppress an inrush current at the time when a power supply of a booster type SW regulator is turned ON.

In order to solve the above-mentioned problem, according to this invention, a MOS transistor is provided between a coil of a booster type SW regulator and a power supply, and when the power supply is turned ON, a resistance value of the MOS transistor is changed from a high state to a low state, so that an inrush current at the time when the power supply is turned ON is suppressed.

DETAILED DESCRIPTION OF THE PREFERRED EMBODIMENTS

Embodiment 1

Figure 1:
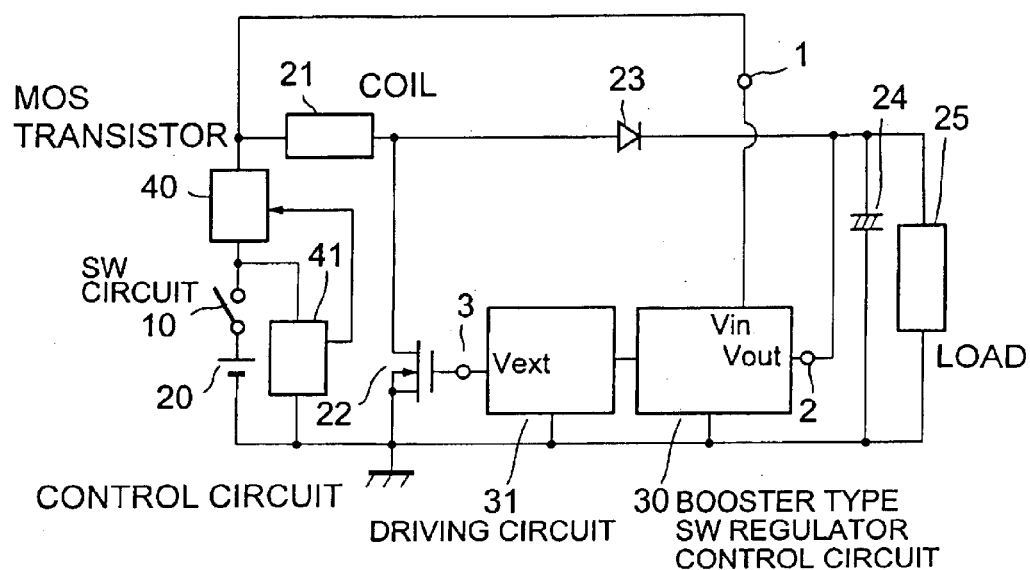
FIG. 1 is an explanatory view of a booster type SW regulator according to a first embodiment of the invention.

Hereinafter, the present invention will be described with reference to the drawings. FIG. 1 shows a booster type SW regulator of a first embodiment of the invention. A SW circuit 10, an input power supply 20, a coil 21, a SW element 22, a diode 23, a booster type SW regulator control circuit 30, a capacitor 24, and a load 25 are the same as those of the related art. In FIG. 1, a MOS transistor 40 and its control circuit 41 are connected.

The control circuit 41 controls a gate voltage of the MOS transistor 40 so that when the SW circuit 10 is turned ON, an ON resistance of the MOS transistor 40 is changed from a large value to a small value.

Figure 2:
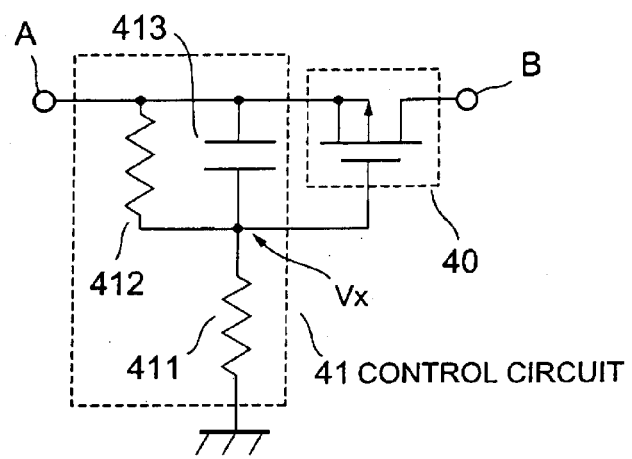
FIG. 2 is an explanatory view of a MOS transistor and a control circuit according to the first embodiment of the invention.

FIG. 2 shows examples of the MOS transistor 40 and the control circuit 41. In the case of FIG. 2, the MOS transistor 40 is a P-ch MOS transistor. The control circuit 41 is constituted by resistances 411 and 412 and a capacitance 413. A point "A" of FIG. 2 is connected to the SW circuit 10 side, and a point "B" is connected to the coil 21 side. The resistance 412 of FIG. 2 is a resistance for discharging the electric charge of the capacitance 413 when the SW circuit is turned OFF. When resistance values of the resistances 411 and 412 are denoted by R411 and R412, respectively, they are generally set to satisfy the relation of R412>R411. In order to suppress electric current consumption at the time when the SW circuit 10 is in the ON state, it is preferable that the values of R411 and R412 are large. When a voltage of the power supply 20 is denoted by V20, a gate-source voltage Vgs of the MOS transistor 40 becomes Vgs=V20× R412/(R411+R412) in a steady state where the SW circuit 10 is in the ON state. In order that the MOS transistor 40 is turned ON, it is necessary that the MOS transistor has a threshold voltage lower than the value of Vgs. When the value of Vgs is large, the ON resistance of the MOS transistor 40 is lowered, and it is possible to suppress a drop in efficiency of the booster type SW regulator circuit.

Figure 3A:
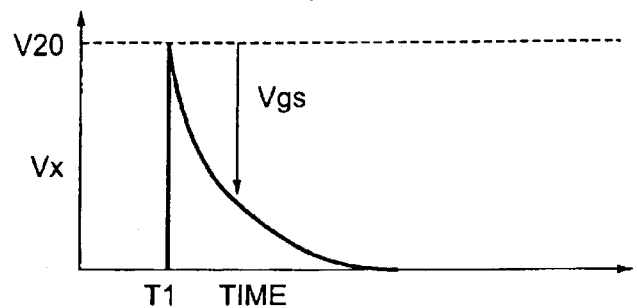
FIGS. 3A and 3B are explanatory views of voltage and current of each part of the booster type SW regulator of the invention.

FIG. 3A shows a voltage waveform Vx of a connection point between the resistances 411 and 412 when the SW circuit 10 is turned ON from the OFF state at a time T1. In FIG. 3A, resistance values of the resistances 412 and 411 are made R412>>R411. At the instant when the SW circuit 10 is turned ON, Vx is raised up to approximately voltage V20 of the power supply 20. Thereafter, it is decreased to the GND level at a time constant of the capacitance 413 and the resistance 411 of FIG. 2.

In FIG. 3A, in the case where the P-ch MOS transistor is used as the MOS transistor 40 as in FIG. 2, a difference voltage between the voltage V20 of the power supply 20 and the voltage of Vx becomes a gate-source voltage Vgs of the MOS transistor. That is, when the voltage of Vx immediately after the SW circuit 10 is turned ON is close to the voltage V20 of the power supply 20, the MOS transistor can not be sufficiently turned ON, and the ON resistance is high. Thereafter, as the voltage of Vx is lowered, the gate-source voltage Vgs of the MOS transistor becomes high, and the ON resistance of the MOS transistor is lowered.

Figure 3B:
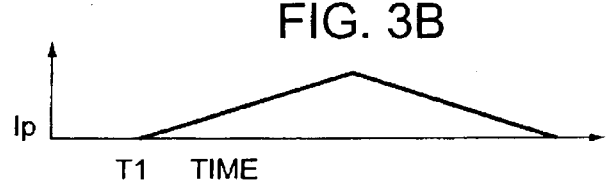

FIG. 3B shows a current Ip of the power supply 20 when the SW circuit 10 is turned ON from the OFF state at the time T1. As compared with the related art, an inrush current can be suppressed by the ON resistance of the MOS transistor.

In the case of FIG. 2, the ON resistance of the MOS transistor is controlled by the time constant of the capacitance 413 and the resistance 411. When this time constant is set to be long, the effect to suppress the inrush current when the SW circuit 10 is turned ON from the OFF state becomes high. However, a rising time of the booster type SW regulator is also elongated.

In general, a time for control of the ON resistance of the MOS transistor is set to a value between 10 $\mu$SEC to 100 mSEC.

In the embodiment of FIG. 2, although the time for control of the ON resistance of the MOS transistor is formed by the capacitance 413 and the resistance 411, the resistance 411 may be made a constant current circuit, or the ON resistance of the MOS transistor may be controlled by making the MOS transistor have an N-ch type and boosting its gate voltage gradually.

Embodiment 2

Figure 4:
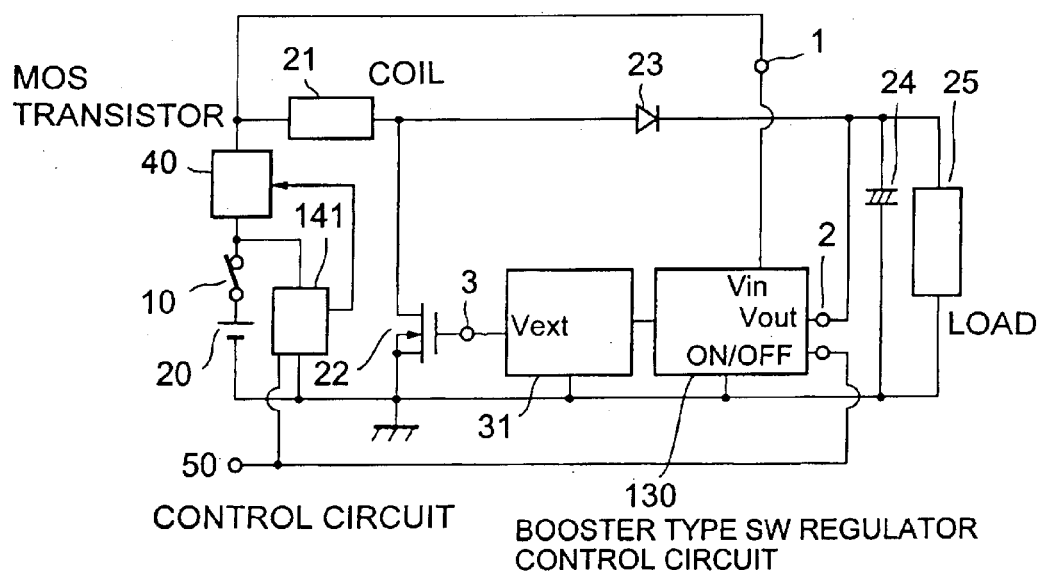
FIG. 4 is an explanatory view of a booster type SW regulator according to a second embodiment of the invention.

FIG. 4 shows a booster type SW regulator according to a second embodiment of the invention. This is different from FIG. 1 in that an ON/OFF control terminal 50 is added. A booster type SW regulator control circuit 130 receives a signal of the ON/OFF control terminal 50, and performs ON/OFF control of the operation. For example, when the voltage level of the ON/OFF terminal 50 is high, the booster type SW regulator control circuit 130 operates, and when it is low, the circuit stops. At the time of the stop state, the booster type SW regulator control circuit 130 performs a control so that the SW element 22 is turned OFF.

A control circuit 141 of a MOS transistor 40 receives a signal of the ON/OFF control terminal 50, and performs a control so that when the booster type SW regulator is put into an ON state from an OFF state, the ON resistance of the MOS transistor is changed from a large value to a small value.

Figure 5:
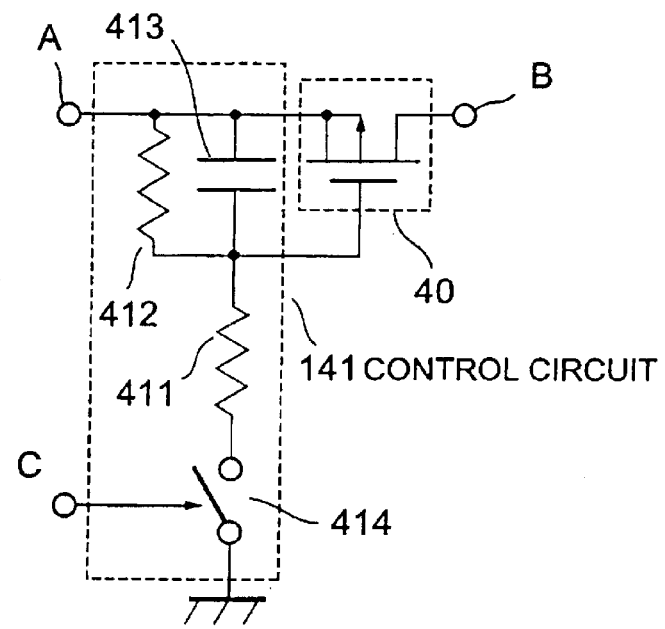
FIG. 5 is an explanatory view of a MOS transistor and a control circuit according to the second embodiment of the invention.
Figure 6:
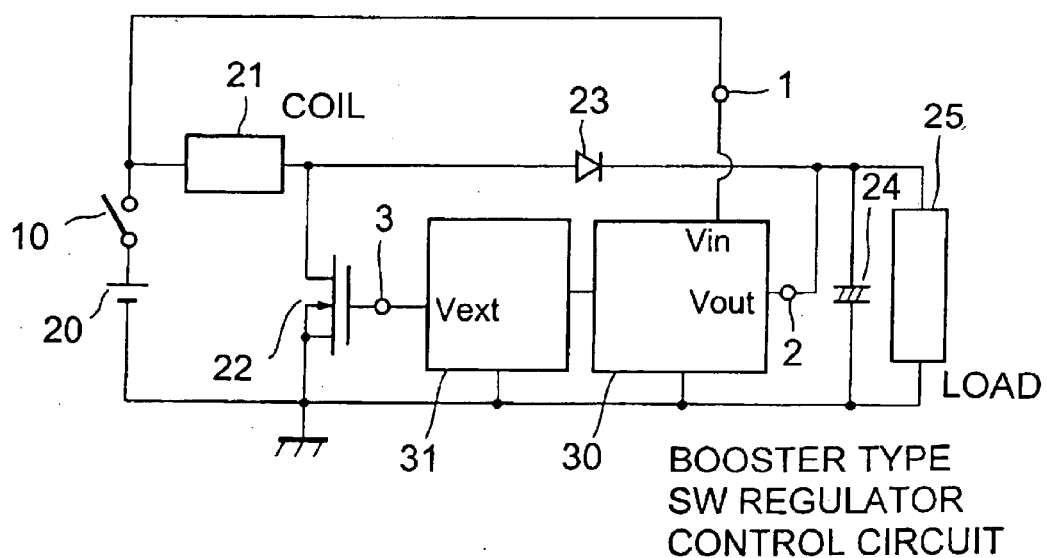
FIG. 6 is an explanatory view of a conventional booster type SW regulator control circuit.
Figure 7A:
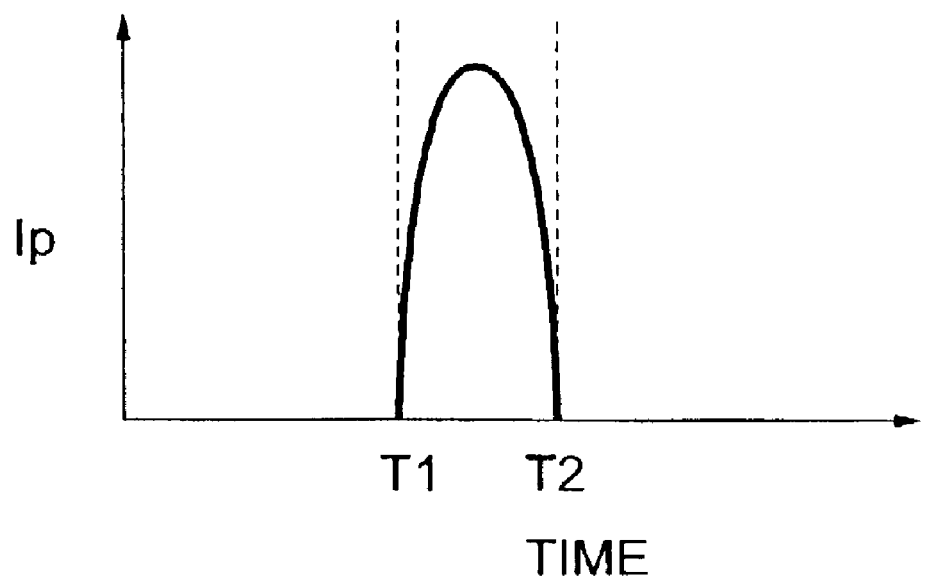
FIGS. 7A and 7B are explanatory views of voltage and current of each part of the conventional booster type SW regulator.
Figure 7B:
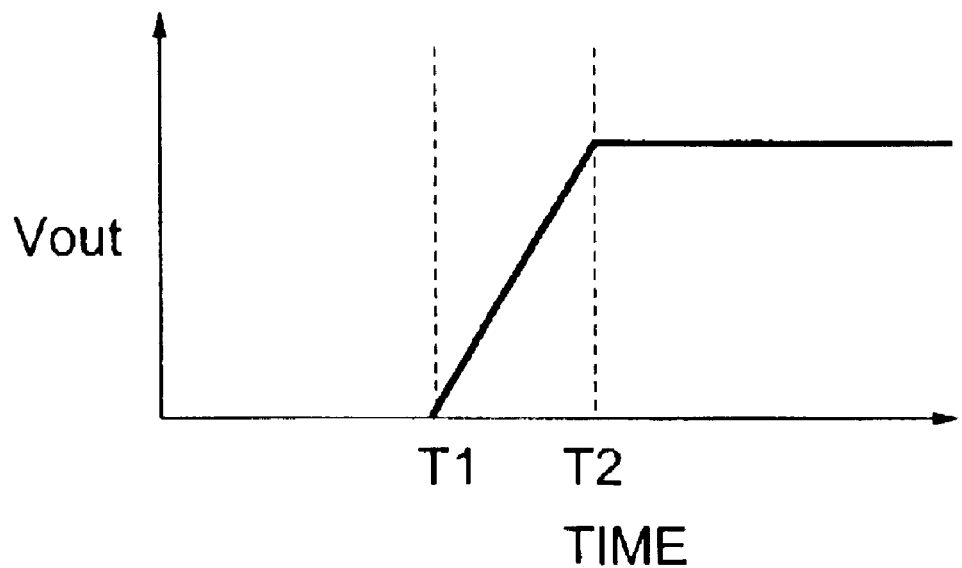

FIG. 5 shows examples of the MOS transistor 40 and the control circuit 141. This is different from FIG. 2 in that a point "C" of the control circuit 141 is connected to the ON/OFF terminal, and a switch circuit 414 is inserted between a resistance 411 and GND. The switch circuit 414 is controlled by the ON/OFF signal, and when the booster type SW regulator is turned ON, the switch circuit 414 is turned ON, and when the booster type SW regulator is turned OFF, the switch circuit 414 is turned OFF.

When the booster type SW regulator is turned ON from the OFF state by the ON/OFF signal, a voltage of a connection point between the resistances 411 and 412 is gradually lowered from the voltage of point "A" to the GND level. That is, the voltage of the connection point of the resistances 411 and 412 after the OFF state is changed to the ON state becomes equal to the state of FIGS. 3A and 3B after the time T1 has elapsed, and there is obtained an effect to suppress the inrush current of the booster type SW regulator as in embodiment 1.

The use of this function can also be made to serve as a soft start of the booster type SW regulator.

Besides, the power supply 20 and the output of the booster type SW regulator can be insulated by turning OFF the MOS transistor 40 when the booster type SW regulator is in the OFF state, and it is possible to suppress electric power consumption in the load 25 at the time of OFF state.

In embodiments 1 and 2, although the ON resistance of the MOS transistor is changed using the CR circuit, the ON resistance of the MOS transistor may be controlled in such a manner that current of the power supply is sensed and the power supply current comes to have a certain constant value. Besides, even when the ON resistance of the MOS transistor is fixed to a high value for a certain period of time after the power activation, a similar effect is obtained.

In the booster type SW regulator of the invention, the MOS transistor is provided between the power supply and the coil, and when the power supply is turned ON, the resistance value of the MOS transistor is changed from a high state to a low state, thereby obtaining an effect that the inrush current at the time when the power supply is turned ON can be suppressed.

What is claimed is:

1. A booster type switching regulator comprising: a coil; an output capacitor connected to an output of the coil; a switching element connected to the output of the coil; a driving circuit for turning ON/OFF the switching element; and a MOS transistor connected between a power supply and an input of the coil, a gate voltage of the MOS transistor being controlled so that when the power supply is activated, an ON resistance of the MOS transistor is gradually reduced from a large value during a time period in a range of 10 $\mu$sec to 10 msec to reduce an inrush current flowing into the output capacitor.

2. A booster type switching regulator according to claim 1; further comprising a control circuit connected to the MOS transistor for controlling the gate voltage of the MOS transistor to gradually vary the ON resistance of the MOS transistor during the time period from a large value immediately after the power supply is activated to a small value.

3. A booster type switching regulator according to claim 2; wherein the control circuit comprises a resistor and a capacitor connected to the power supply and having a node connected to a gate terminal of the MOS transistor, a voltage at the node gradually decreasing from a value approximately equal to a voltage of the power supply voltage to ground potential based on a time constant of the resistor and the capacitor.

4. A booster type switching regulator according to claim 1; further comprising a rectifying device connected between input and output terminals of the regulator and in series with the coil.

5. A booster type switching regulator according to claim 4; wherein the output capacitor is connected between the output terminal and a ground terminal.

6. A voltage regulator, comprising: input and output terminals; a power supply connected to the input terminal; a switch circuit connected to the power supply; a coil connected between the switch circuit and the output terminal; a rectifying device connected in series between the coil and the output terminal; an output capacitor connected to the output terminal; a switching element connected between the coil and the rectifying device; a driving circuit for driving the switching element; a transistor connected between the power supply and the coil; and a control circuit connected to the transistor for gradually varying an ON resistance of the transistor from a relatively large value immediately after the switch circuit is turned on to a relatively small value a predetermined time thereafter to limit a rush current flowing into the output capacitor from the power supply.

7. A voltage regulator according to claim 6; wherein the control circuit comprises a resistor and a capacitor connected to the power supply and having a node connected to a control terminal of the transistor, a voltage at the node gradually decreasing from a value approximately equal to a voltage of the power supply voltage to ground potential based on a time constant of the resistor and the capacitor.

8. A voltage regulator according to claim 7; wherein the node is connected to a gate of the transistor.

9. A voltage regulator according to claim 7; wherein the time constant is in the range of 10 $\mu$sec to 100 msec.

10. A voltage regulator, comprising: input and output terminals; a power supply connected to the input terminal; a switch circuit connected to the power supply; a coil connected between the switch circuit and the output terminal; an output capacitor connected to the output terminal; a switching element connected between the coil and the output terminal; a driving circuit for driving the switching element; a transistor connected between the power supply and the coil; and a control circuit connected to the transistor for gradually varying an ON resistance of the transistor from a relatively large value immediately after the switch circuit is turned on to a relatively small value a predetermined time thereafter to limit a rush current flowing into the output capacitor from the power supply.

11. A voltage regulator according to claim 10; wherein the control circuit comprises a resistor and a capacitor connected to the power supply and having a node connected to a control terminal of the transistor, a voltage at the node gradually decreasing from a value approximately equal to a voltage of the power supply voltage to ground potential based on a time constant of the resistor and the capacitor.

12. A voltage regulator according to claim 11; wherein the node is connected to a gate of the transistor.

13. A voltage regulator according to claim 11; wherein the time constant is in the range of 10 $\mu$sec to 100 msec.

* * * * *